United States Patent
Anderson et al.

[19]

[11] Patent Number: 6,158,743
[45] Date of Patent: Dec. 12, 2000

[54] HUB SEAL WITH LOW INSTALLATION LOAD AND ROTATION PREVENTION STRUCTURE

[75] Inventors: Todd L. Anderson; Laurence B. Winn, both of Longview, Tex.

[73] Assignee: Stemco Inc, Longview, Tex.

[21] Appl. No.: 09/102,534

[22] Filed: Jun. 22, 1998

[51] Int. Cl.$^7$ .............................. F16J 15/34; F16J 15/32
[52] U.S. Cl. .......................... 277/373; 277/574; 277/571
[58] Field of Search .................................... 277/371, 373, 277/375, 551, 562, 572, 574, 571

[56] References Cited

U.S. PATENT DOCUMENTS

| | | | |
|---|---|---|---|
| 3,028,203 | 4/1962 | Lund et al. | 384/485 |
| 3,685,841 | 8/1972 | Keller . | |
| 3,913,924 | 10/1975 | Barefoot et al. | 277/574 |
| 4,132,421 | 1/1979 | Corsi et al. . | |
| 4,183,892 | 1/1980 | Corsi et al. . | |
| 4,208,057 | 6/1980 | Messenger . | |
| 4,243,235 | 1/1981 | Repella . | |
| 4,252,329 | 2/1981 | Messenger . | |
| 4,440,405 | 4/1984 | Schaus et al. . | |
| 4,441,722 | 4/1984 | Pichler . | |
| 4,451,050 | 5/1984 | Repella . | |
| 4,497,496 | 2/1985 | Repella . | |
| 4,501,431 | 2/1985 | Peisker et al. . | |
| 4,557,488 | 12/1985 | Litherland | 277/461 |
| 4,591,168 | 5/1986 | Hölzer . | |
| 4,695,063 | 9/1987 | Schmitt et al. . | |
| 4,705,277 | 11/1987 | Repella . | |
| 4,709,930 | 12/1987 | Forch . | |
| 4,721,314 | 1/1988 | Kanayama et al. . | |
| 4,739,998 | 4/1988 | Steusloff et al. . | |
| 4,783,086 | 11/1988 | Bras et al. . | |
| 4,844,480 | 7/1989 | Gralka . | |
| 4,856,794 | 8/1989 | Boyers et al. . | |
| 4,906,009 | 3/1990 | Saitoh . | |
| 5,015,001 | 5/1991 | Jay . | |
| 5,024,364 | 6/1991 | Nash . | |
| 5,056,799 | 10/1991 | Takenaka et al. . | |
| 5,139,275 | 8/1992 | Ehrmann et al. . | |
| 5,190,299 | 3/1993 | Johnston . | |
| 5,195,757 | 3/1993 | Dahll, V . | |
| 5,209,499 | 5/1993 | Ruff, Jr. et al. . | |
| 5,427,387 | 6/1995 | Johnston . | |
| 5,577,741 | 11/1996 | Sink . | |
| 5,615,894 | 4/1997 | vom Schemm . | |

FOREIGN PATENT DOCUMENTS

703 031  1/1930  Germany .

*Primary Examiner*—Anthony Knight
*Assistant Examiner*—Alison K. Pickard
*Attorney, Agent, or Firm*—Cummings & Lockwood

[57] ABSTRACT

A hub seal for installation on the wheel end of a heavy duty trailer or truck is disclosed which includes an annular casing having a radially outer surface configured to sealingly engage an accommodating surface of a wheel hub mounted for rotation about a stationary spindle shaft, and an annular wear ring mounted coaxial with the annular casing and having a radially inner surface configured to sealingly engage an outer periphery of a stationary spindle shaft. The sealing surface of the annular wear ring includes structure for providing radial torque resistance between the annular wear ring and the stationary spindle shaft and for limiting installation loads associated with installing the annular wear ring on the stationary spindle shaft. Similarly, the sealing surface of the annular casing includes structure for providing radial torque resistance between the annular casing and the wheel hub and for limiting installation loads associated with installing the annular casing in the wheel hub.

30 Claims, 6 Drawing Sheets

HUB SEAL WITH LOW INSTALLATION LOAD AND ROTATION PREVENTION STRUCTURE

BACKGROUND OF THE INVENTION

1. Field of the Invention

The subject invention relates to a dynamic sealing device, and more particularly, to a unitized hub seal for installation on a stationary vehicle axle which includes structure for limiting installation load and for preventing rotation of the hub seal components relative to the wheel end and/or the hub.

2. Background of the Related Art

In tractor and trailer wheel end axle assemblies, particularly those employed on large trailers, semi-trailers and tractors, the wheel is mounted on a fixed axle for rotation thereabout. The hub of the wheel defines a lubricant chamber about the end of the axle in association with the wheel bearings. A quantity of lubricant is maintained in the lubricant chamber to continuously bathe the bearings. A hub cap is used to enclose the lubricant chamber and a shaft seal is fit onto the axle to effect a dynamic seal between the axle and the lubricant chamber.

Shaft seals are well known in the art, and generally include a wear member or sleeve and a seal member or casing. The casing is mounted to rotate with the wheel hub relative to the sleeve member. The casing has an outer diameter which is designed to provide an interference fit with the wheel hub and the sleeve is dimensioned to be press fit onto the stationary wheel axle. An early example of a unitized shaft seal in which the wear member and seal member are constructed as a one-piece assembly is disclosed in U.S. Pat. No. 3,685,841 to Keller. Later examples of semi-unitized shaft seals in which the wear member and seal member can be disassembled for repair and inspection are disclosed in U.S. Pat. Nos. 4,208,057 and 4,252,329 to Messenger.

U.S. Pat. No. 4,856,794 to Boyers et al. discloses a unitized seal with axially extending and radially protruding elastomeric ribs formed on the inner wear surface of the sleeve mounted on a vehicle axle for preventing the rotation of the wear sleeve relative to the axle during vehicle operation, i.e., when the casing is rotating with the wheel hub. The axially extending ribs extend to a greater radial height than the radially protruding ribs and thus offer significant axial resistance when the wear sleeve is press fit onto the vehicle axle during installation, unnecessarily increasing axial installation forces. Clearly, there is a need in the art for a unitized seal in which the wear sleeve has anti-rotation structures which reduce, rather than increase, axial installation forces.

SUMMARY OF THE INVENTION

The subject invention is directed to a dynamic hub sealing device for installation on the wheel end of a heavy duty trailer or truck which overcomes the inadequacies of prior art unitized hub sealing devices by limiting the installation load associated therewith and preventing the rotation of the outer casing relative to the wheel hub and the inner wear ring relative to the stationary spindle shaft of the wheel end.

In accordance with a preferred embodiment of the subject invention, the sealing device includes an annular casing having a radially outer surface configured to sealingly engage by interference fit an accommodating surface of a wheel hub mounted for rotation about a stationary spindle shaft, and an annular wear ring mounted coaxial with the annular casing and having a radially inner surface configured to sealingly engage an outer periphery of a stationary spindle shaft by press fitting the ring on the shaft.

The radially inner surface of the annular wear ring is formed of a compliant material, such as, for example, an elastomeric material, and includes a plurality of axially spaced apart radially inwardly projecting annular sealing beads and a plurality of circumferentially spaced apart axially extending bridges which extend between adjacent pairs of sealing beads. The radially inwardly projecting sealing beads and the axially extending bridges associated therewith are of equal radial height.

Preferably, the plurality of inwardly projecting sealing beads includes first through fifth inwardly projecting sealing beads, with the first or leading sealing bead disposed adjacent an inboard side of the sealing device and the fifth or trailing sealing bead disposed adjacent an outboard side of the sealing device. Preferably, a first set of circumferentially spaced apart axially extending bridges extend between the first and second inwardly projecting sealing beads, and a second set circumferentially spaced apart axially extending bridges extend between the second and third inwardly projecting sealing beads. Preferably, the first set of circumferentially spaced apart axially extending bridges on the sealing surface of the wear ring are disposed in an alternating or staggered relationship with respect to the second set of circumferentially spaced apart axially extending bridges on the sealing surface of the wear ring, such that none of the bridges on the sealing surface of the wear ring are axially aligned.

The axially extending bridges of the first and second bridge sets of the wear ring provide two distinct functions. The first function is to incrementally decrease the installation forces experienced by each successive sealing bead by axially transferring the installation load from bead-to-bead. The second function is to provide radial torque resistance at the interface between the wear ring and the spindle shaft by increasing the amount of elastomeric surface area in contact with the outer periphery of the spindle shaft.

The radially outer surface of the annular casing is also formed of a compliant material, such as, for example, an elastomeric material, and includes a plurality of axially spaced apart radially outwardly projecting annular sealing ribs and a plurality of circumferentially spaced apart axially extending bridges which extend between adjacent pairs of sealing ribs. The outwardly projecting sealing ribs and the axially extending bridges associated therewith are of equal radial height.

Preferably, the plurality of radially outwardly projecting sealing ribs includes first through fifth radially outwardly projecting sealing ribs, with the first or leading sealing rib disposed adjacent an outboard side of the sealing device and the fifth or trailing sealing rib disposed adjacent an inboard side of the sealing device. Preferably, a first set of circumferentially spaced apart axially extending bridges extend between the first and second outwardly projecting sealing beads, and a second set circumferentially spaced apart axially extending bridges extend between the second and third outwardly projecting sealing beads. Preferably, the first set of circumferentially spaced apart axially extending bridges on the sealing surface of the outer casing are disposed in an alternating or staggered relationship with respect to the second set of circumferentially spaced apart axially extending bridges on the sealing surface of the outer casing, such that none of the bridges on the sealing surface of the outer casing are axially aligned.

The axially extending bridges of the first and second bridge sets of the outer casing provide two distinct functions. The first function is to incrementally decrease the installation forces experienced by each successive sealing rib by axially transferring the installation load from rib-to-rib when the outer casing is mounted within the interior cavity of the wheel hub. The second function is to provide radial torque resistance at the interface between the casing and the wheel hub by increasing the amount of elastomeric surface area in contact with the interior surface of the wheel hub.

These and other features of the dynamic hub seal of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use the hub seal of the subject invention, preferred embodiments of the sealing device will be described in detail hereinbelow with reference to the drawings wherein.

DETAILED DESCRIPTION OF THE PREFERRED EMBODIMENTS

Figure 1:
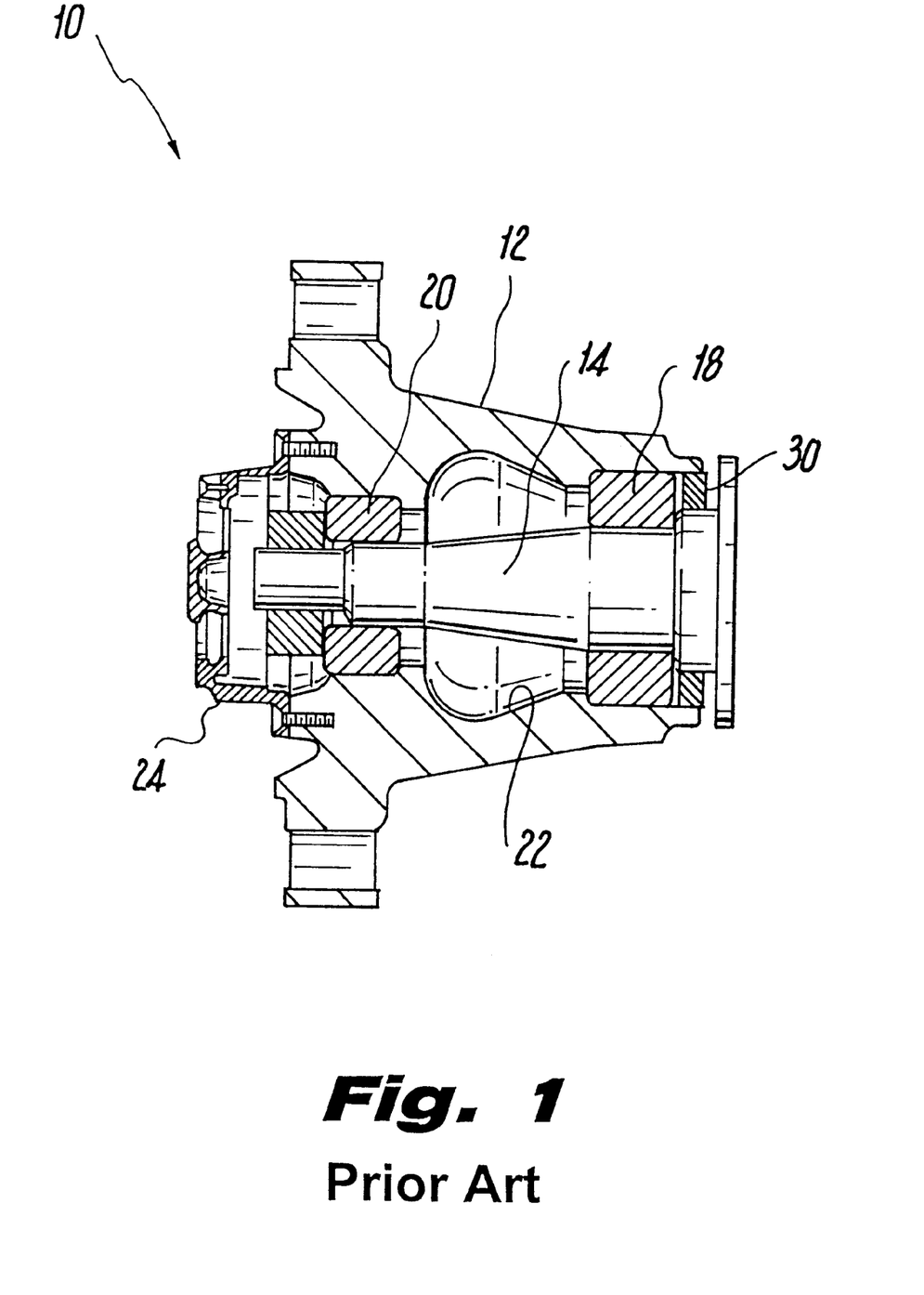
FIG. 1 is a cross-sectional view of a typical trailer wheel end including a vehicle hub mounted on a stationary spindle shaft supported by inboard and outboard roller bearings and including a shaft seal assembly located adjacent the inboard end of the spindle shaft.

Referring now to the drawings wherein like reference numerals identify similar structural elements of the prior art and the subject invention, there is illustrated in FIG. 1 a typical tractor/trailer wheel end assembly designated generally by reference numeral 10. Wheel end assembly 10 includes a vehicle hub 12 mounted on a stationary spindle shaft 14 and supported by inboard and outboard roller bearings 18 and 20. The interior bore 22 of vehicle hub 12 defines a chamber for accommodating lubricant which continuously bathes roller bearings 18 and 20. A hub cap 24 encloses the outboard end of the interior bore 22 of vehicle hub 12 and the inboard end of the interior bore 22 is sealed by a dynamic hub sealing device 30 mounted adjacent the inboard end of spindle shaft 14. The hub sealing device 30 is designed to seal lubricant within the interior bore 22 of vehicle hub 12 and prevent contaminants from entering the interior bore 22 of vehicle hub 12 from the inboard air side of the sealing device. During vehicle operation, the vehicle hub 12 rotates about the spindle shaft 14 supported by roller bearings 18 and 20.

Figure 2:
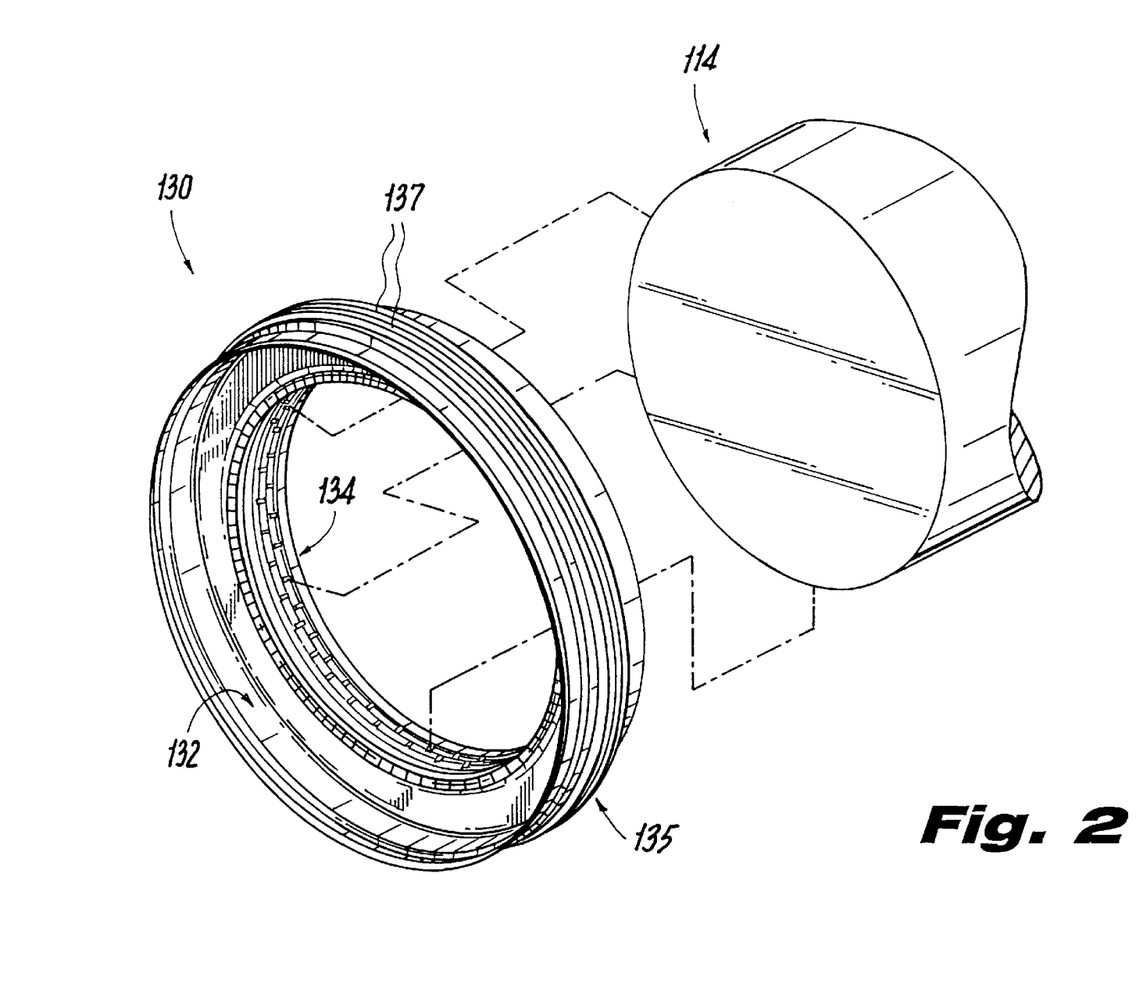
FIG. 2 is a perspective view of a vehicle hub seal constructed in accordance with a preferred embodiment of the subject invention for installation on a stationary spindle shaft.

Referring now to FIG. 2 in conjunction with FIG. 1, there is illustrated a dynamic hub sealing device constructed in accordance with a preferred embodiment of the subject invention and designated generally by reference numeral 130. Hub seal assembly 130 includes an annular metallic outer casing 132 and an annular metallic inner wear sleeve or ring 134. A molded elastomeric static sealing structure 135 is provided on the radially outer surface of the outer casing 132 for sealingly engaging the interior sealing surface of the interior bore of a vehicle wheel hub through an interference fit. The static sealing structure includes a plurality of axially spaced apart sealing ribs 137 which provide radial torque resistance against the sealing surface of the wheel hub. Moreover, the sealing ribs 137 inhibit rotation of the outer casing 132 relative to the wheel hub during vehicle operation.

When hub seal 130 is installed on the spindle shaft 114 of a vehicle axle, the axially spaced apart sealing ribs 137 of outer casing 132 generate high installation forces relative to the interior sealing surface of the wheel hub. However, these forces do not adversely affect seal performance. In contrast, seal performance can be adversely affected if the inner wear ring of a hub seal assembly experiences high installation forces, as is the case in prior art hub seals such as that which is disclosed in U.S. Pat. No. 4,856,794 to Boyers et al. Thus, the interior wear surface of the annular wear ring 134 of the subject invention is adapted and configured to significantly limit the amount of installation forces required to press fit the wear ring 134 onto a spindle shaft when hub assembly 130 is mounted on a wheel end of a vehicle.

Figures 3, 4, 5:
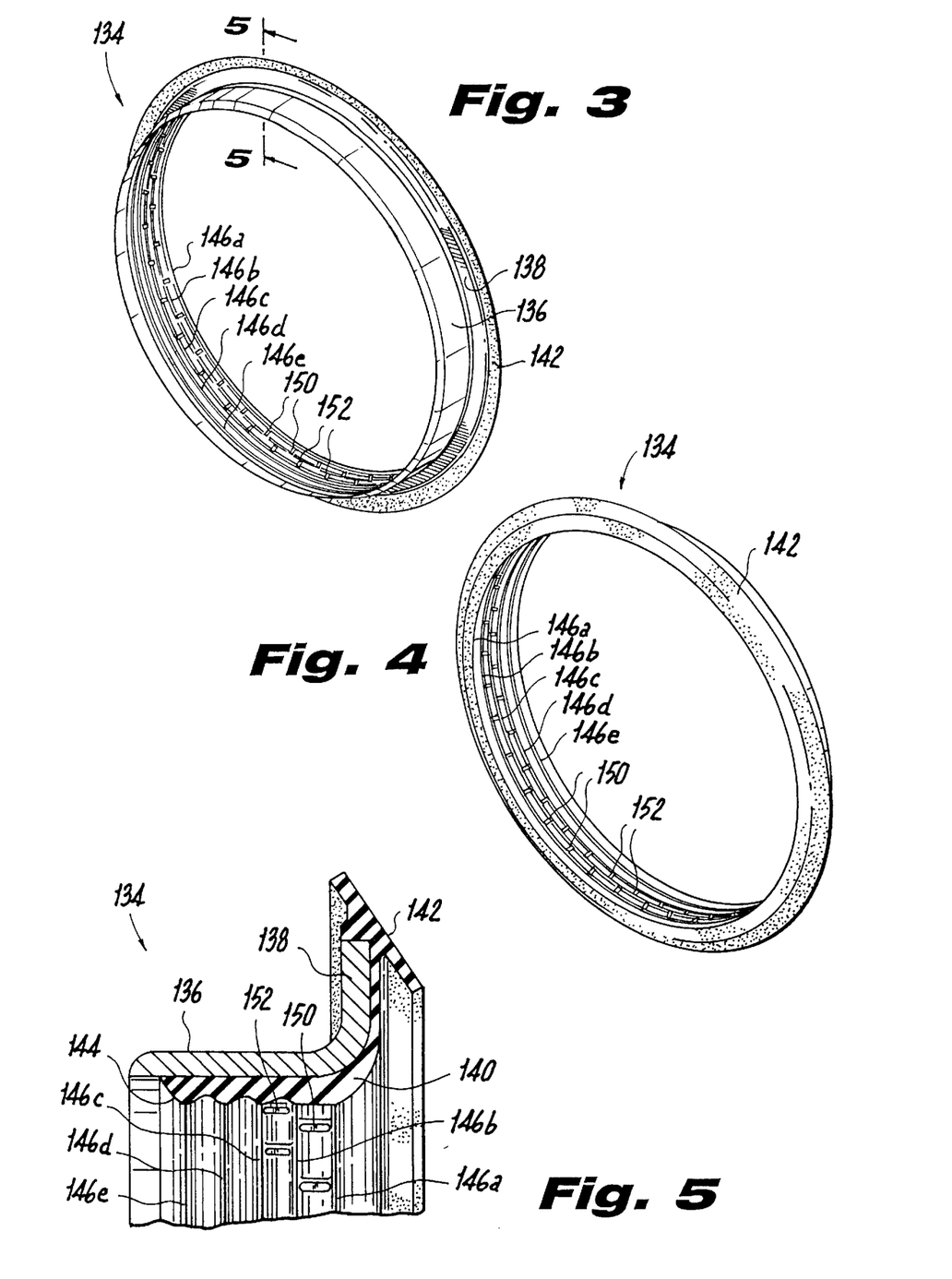
FIG. 3 is a perspective view of the wear ring of the vehicle hub seal illustrated in FIG. 2 as viewed from the outboard side thereof.
FIG. 4 is a perspective view of the wear ring of the vehicle hub seal illustrated in FIG. 2 as viewed from the inboard side thereof.
FIG. 5 is a cross-sectional view of the wear ring of the vehicle hub seal illustrated in FIG. 2 taken along line 5—5 of FIG. 3.

Referring to FIGS. 3 through 5, annular wear ring 134 includes an axially extending portion 136 and a radially depending portion 138. A molded elastomeric sealing structure 140 is substantially coextensive with the interior surfaces of the axially extending portion 136 and the radially depending portion 138. Sealing structure 140 includes a deformable sealing lip 142 which projects from the radially extending portion 138 for interacting with the interior of outer casing 132, and an axially extending compliant sealing surface 144 for interacting with the sealing surface of spindle shaft 114.

As best seen in FIG. 5, the compliant sealing surface 144 includes a plurality of axially spaced apart annular sealing beads 146a–146e which project radially inwardly from the axially extending portion 136 of wear ring 134 and define a series of annular channels therebetween. As illustrated, sealing bead 146a defines the first or leading sealing bead while sealing bead 146e defines the fifth or trailing sealing bead. The leading sealing bead 146a is positioned adjacent the inboard side of wear ring 134 and the trailing sealing bead 146e is positioned adjacent the outboard side of wear ring 134.

A first set of circumferentially spaced apart axially extending bridges 150 traverse the annular channel between the leading annular sealing bead 146a and the second annular sealing bead 146b to interconnect the first and second sealing beads to one another at a plurality of circumferentially spaced apart locations. Similarly, a second set of circumferentially spaced apart axially extending bridges 152 traverse the annular channel between the second annular sealing bead 146b and the third annular sealing bead 146c to interconnect the second and third sealing beads to one another at a plurality of circumferentially spaced apart locations. The first and second bridge sets 150 and 152 are disposed in a staggered or alternating relationship so that none of the connective bridges on the sealing surface of wear ring 134 are axially aligned. In accordance with a preferred embodiment of the subject invention, each of the axially extending bridges of the first and second bridge sets 150 and 152, and each of the axially spaced apart annular sealing beads 146a–146e are of equal radial height. This geometric relationship is best seen in FIG. 5

Figure 6:
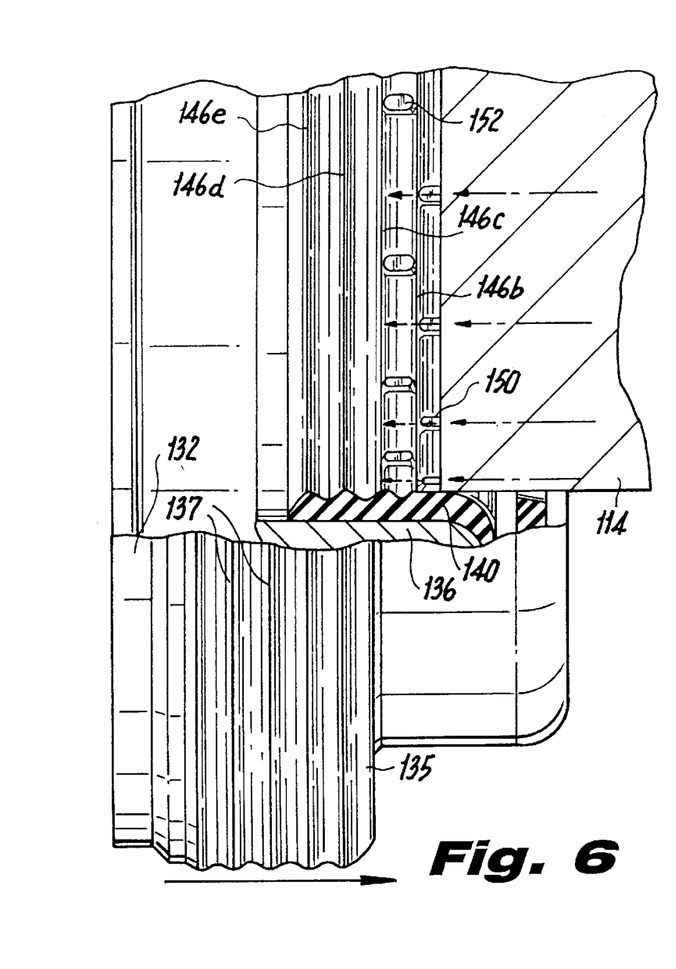
FIG. 6 is a partial cross-sectional view of a portion of the vehicle hub seal illustrated in FIG. 2 during installation of the hub seal on a stationary spindle shaft.

The axially extending bridges of the first and second bridge sets 150 and 152 provide two distinct functions. The first function is to incrementally decrease the installation forces experienced by each successive sealing bead by axially transferring the installation load from bead-to-bead. More particularly, as best seen in FIG. 6, during installation, as the leading annular bead 146a is extended over spindle shaft 114, the first set of bridges 150 transfers a portion of the installation load experienced by the first annular bead 146a to the second annular bead 146b. This load transference is depicted in FIG. 6 by the directional arrows extending across the bridge sets. Thereupon, the second annular bead 146b reacts by deflecting as if it was already directly interacting with spindle shaft 114.

Thereafter, when the second annular bead 146b interacts with the spindle shaft 114, less installation force is required to completely deform the second annular bead 146b. At such a time, the second set of axially extending bridges 152 transfer a portion of the installation load experienced by the second annular bead 146b to the third annular bead 146c. Thereupon, the third annular bead 146c reacts by deflecting as if it was already directly interacting with axle shaft 114. Thus, the installation load on the third annular bead 146c is lessened by the amount of load transference from the second annular bead 146b.

Installation loads associated with the hub seal 130 of the subject invention are also limited through Poisson's effect. More specifically, as the axially extending bridges push against an adjacent annular bead, the circumference of that bead increases in length. Consequently, the material from which that annular bead is comprised must be redistributed to accommodate for this increase circumferential length. Those skilled in the art will readily appreciate that the material that is most freely redistributable is that which lies at the inner diameter of the annular bead. Thus, it follows that as the material is redistributed, the inner diameter of the bead increases, lessening the installation force required to deform the bead.

Figure 7:
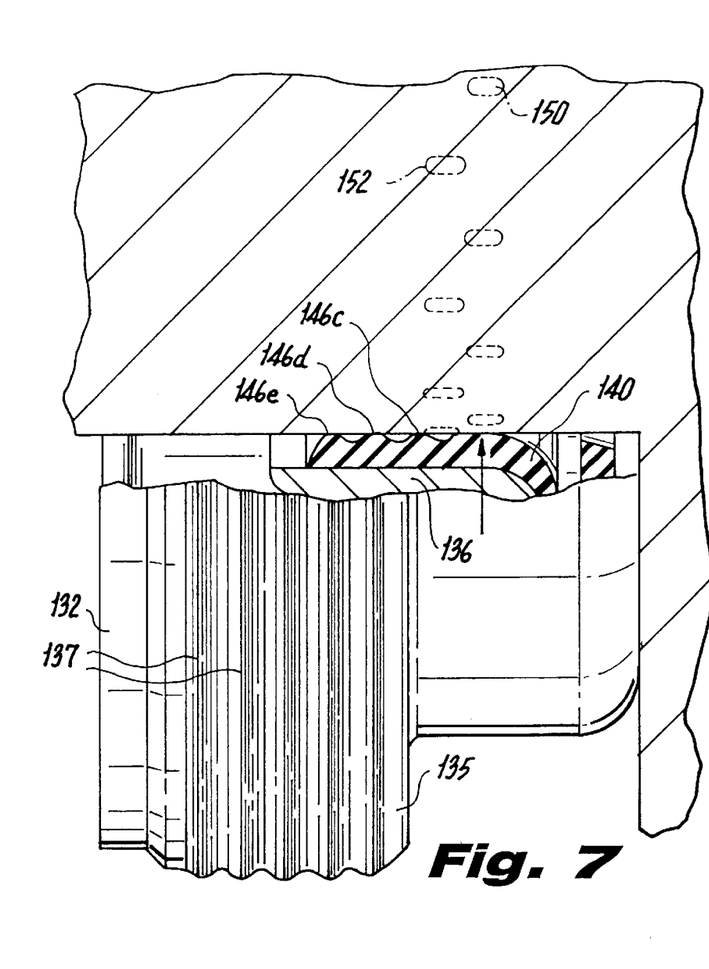
FIG. 7 is a partial cross-sectional view of a portion of the vehicle hub seal illustrated in FIG. 2 after the hub seal has been installed on a stationary spindle shaft.

Referring to FIG. 7, the second function of the axially extending bridges is to provide radial torque resistance at the interface between wear ring 134 and spindle shaft 114 (see generally FIG. 2). This is accomplished in part by the increased amount of elastomeric surface area in contact with the outer periphery of the spindle shaft. In addition, because the two sets of axially extending bridges 150 and 152 are in a staggered orientation, the compressive holding force of each successive bridge, indicated by the directional arrow in FIG. 7, would have to be overcome in order for the wear ring 134 to slide relative to spindle shaft 114, thereby increasing radial torque resistance.

Figure 8:
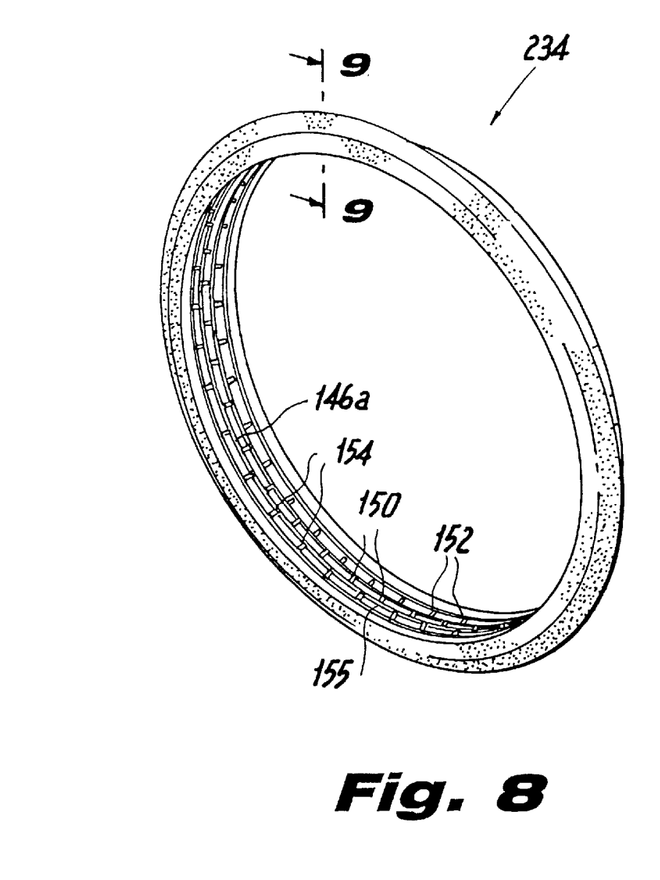
FIG. 8 is a perspective view of another wear ring constructed in accordance with a preferred embodiment of the subject invention as viewed from the inboard side thereof.
Figure 9:
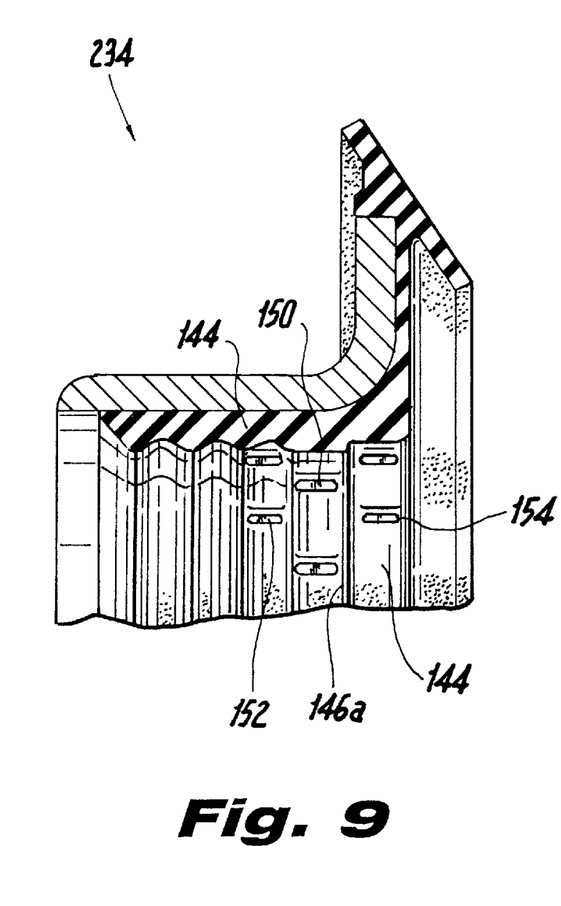
FIG. 9 is a cross-sectional view of the wear ring of the vehicle hub seal illustrated in FIG. 8 taken along line 9—9 of FIG. 8.

Referring now to FIGS. 8 and 9, there is illustrated another wear ring constructed in accordance with a preferred embodiment of the subject invention and designated generally by reference numeral 234. Wear ring 234 differs from wear ring 134 in that it includes an additional set of circumferentially spaced apart axially extending bridges 154 which are located on the land area 155 of sealing surface 144. Bridge set 154 precedes the leading annular bead 146a to decrease the installation forces experienced thereby. More particularly, during installation, as the axially extending bridges 154 are extended over spindle shaft 114, a portion of the installation load is transferred to the annular bead 146a.

Figure 10:
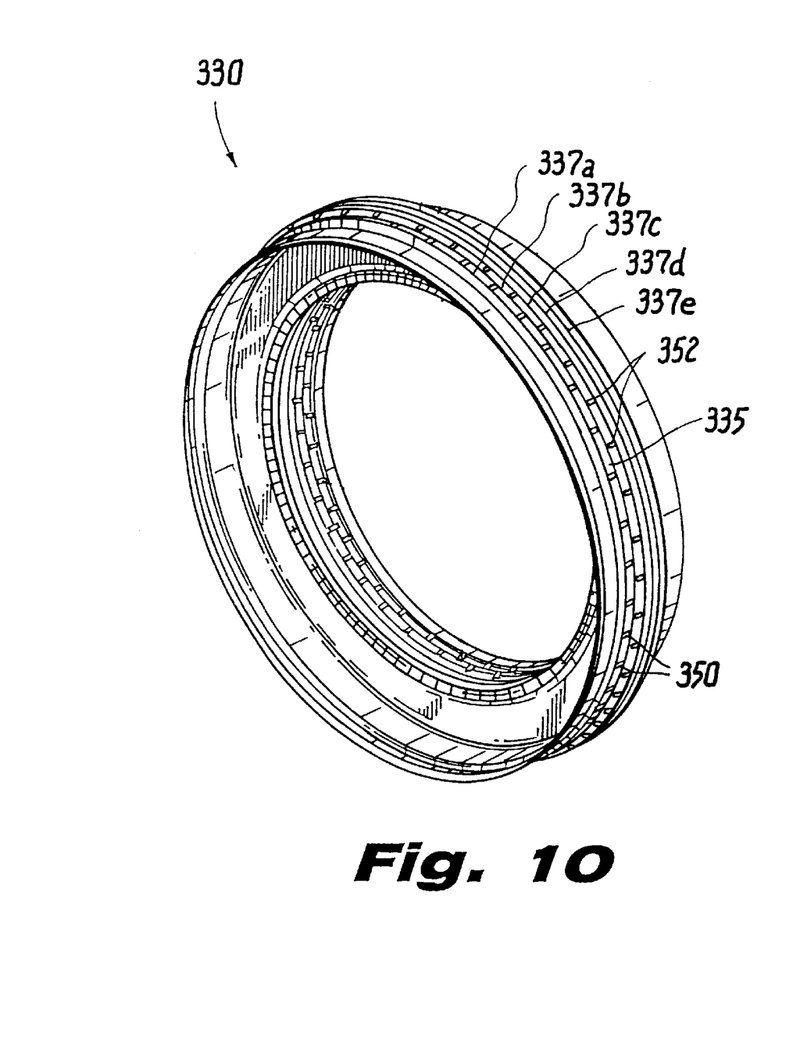
FIG. 10 is a perspective view of another vehicle hub seal constructed in accordance with a preferred embodiment of the subject invention.
Figure 11:
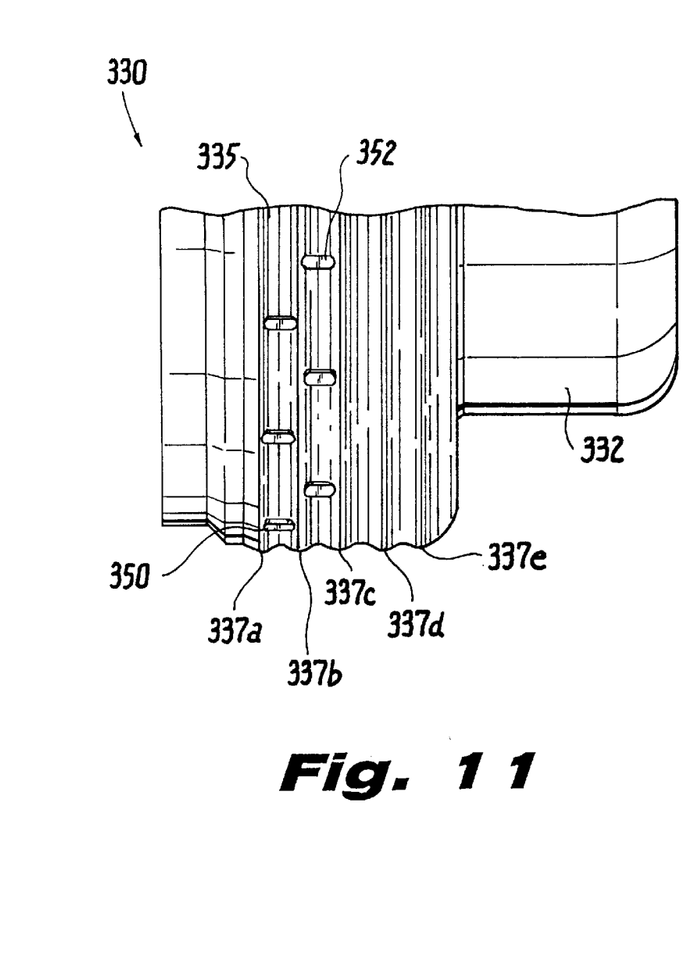
FIG. 11 is a side elevational view of a portion of the vehicle hub seal illustrated in FIG. 10.

Referring now to FIGS. 10 and 11, there is illustrated another hub seal device constructed in accordance with a preferred embodiment of the subject invention and designated generally by reference numeral 330. Hub seal assembly 330 differs from the hub seal assembly 130 illustrated in FIG. 2 in that alternating sets of circumferentially spaced apart axially extending bridges traverse the annular channels between adjacent pairs of spaced apart sealing ribs formed on the radially outer surface of the outer casing 332. Similar in function to the axially extending bridges of the wear rings described hereinabove, the bridging structures on outer casing 332 function to decrease installation forces associated with the engagement of the outer casing and the sealing surface of the interior cavity of the wheel hub, as well as provide radial torque resistance against the sealing surface of the wheel hub.

As illustrated in FIGS. 10 and 11, the elastomeric sealing structure 335 includes first through fifth axially spaced apart annular sealing ribs 337a–337e. On the sealing surface 335 of outer casing 332, the leading sealing rib 337a is disposed adjacent the outboard side of the sealing device 330, since the outer casing of the sealing device is mounted within the interior cavity of the wheel hub from the inboard side thereof during installation. This is in contrast to the leading annular sealing bead of the inner wear ring, which is disposed adjacent the inboard side of the sealing device.

With continuing reference to FIGS. 10 and 11, a first set of axially extending bridges 350 traverse the annular channel defined between the leading annular rib 337a and the second annular rib 337b to interconnect the first and second annular sealing ribs to one another at a plurality of circumferentially spaced apart locations. Similarly, a second set of circumferentially spaced apart axially extending bridges 352 traverse the annular channel between the second annular sealing rib 337b and the third annular sealing rib 337c to interconnect the second and third sealing ribs to one another at a plurality of circumferentially spaced apart locations.

The first and second bridge sets 350 and 352 are disposed in a staggered or alternating relationship so that none of the connective bridges on the sealing surface of outer casing 332 are axially aligned. In accordance with a preferred embodiment of the subject invention, each of the axially extending bridges of the first and second bridge sets 350 and 352, and each of the axially spaced apart annular sealing ribs 337a–337e are of equal radial height. Although not illustrated, it is envisioned that sealing structure 335 could include another bridge set which would extend from the outboard side of the leading annular sealing rib 337a, similar in form and function to the additional bridge set 154 which precedes the leading annular sealing bead 146a of wear ring 234.

During installation, as the leading annular rib 337a is extended into the sealing bore of a wheel hub, the first set of bridges 350 transfers a portion of the installation load experienced by the first annular rib 337a to the second annular bead 337b. Thereupon, the second annular rib 337b reacts by deflecting as if it was already directly interacting with the sealing surface of the wheel hub. Thereafter, when the second annular rib 337b interacts with the sealing surface of the wheel hub, less installation force is required to completely deform the second annular rib 337b. At such a time, the second set of axially extending bridges 352 transfer a portion of the installation load experienced by the second annular rib 337b to the third annular rib 337c. Thereupon, the third annular rib 337c reacts by deflecting as if it was already directly interacting with the sealing surface of the wheel hub. Thus, the installation load on the third annular rib 337c is lessened by the amount of load transference from the second annular rib 337b.

Although the hub seal assembly of the subject invention has been described with respect to a preferred embodiment, it is apparent that modifications and changes can be made thereto without departing from the spirit and scope of the invention as defined by the appended claims.

What is claimed is:

1. A sealing device for installation on the wheel end of a vehicle comprising:
   a) an annular casing having a radially outer surface configured to sealingly engage an accommodating surface of a wheel hub mounted for rotation about a stationary spindle shaft; and
   b) an annular wear ring mounted coaxial with said annular casing and having a radially inner surface configured to sealingly engage an outer periphery of a stationary spindle shaft, said inner surface of said annular wear ring formed of a compliant material having a plurality of axially spaced apart radially inwardly projecting annular sealing beads formed thereon, and a plurality of circumferentially spaced apart axially extending bridges extending between adjacent pairs of said sealing beads for transferring axial installation loads from one annular sealing bead to another annular sealing bead.

2. A sealing device as recited in claim 1, wherein said radially inwardly projecting sealing beads and said axially extending bridges are of equal radial height.

3. A sealing device as recited in claim 1, wherein said plurality of radially inwardly projecting sealing beads includes first through fifth inwardly projecting sealing beads, with the first sealing bead defining a leading sealing bead disposed adjacent an inboard side of said sealing device and the fifth sealing bead defining a trailing sealing bead disposed adjacent an outboard side of said sealing device.

4. A sealing device as recited in claim 3, wherein a first set of circumferentially spaced apart axially extending bridges extend between the first and second inwardly projecting sealing beads, and a second set circumferentially spaced apart axially extending bridges extend between the second and third inwardly projecting sealing beads.

5. A sealing device as recited in claim 4, wherein said first set of circumferentially spaced apart axially extending bridges are disposed in alternating relationship with respect to said second set of circumferentially spaced apart axially extending bridges.

6. A sealing device as recited in claim 1, wherein said inner surface of said annular wear ring is formed of an elastomeric material.

7. A sealing device for installation on the wheel end of a vehicle comprising:
   a) an annular casing having a radially outer surface configured to sealingly engage an accommodating surface of a wheel hub mounted for rotation about a stationary spindle shaft; and
   b) an annular wear ring mounted coaxial with said annular casing and having a radially inner surface configured to sealingly engage an outer periphery of a stationary spindle shaft, said inner surface of said annular wear ring having means for providing radial torque resistance between said annular wear ring and said stationary spindle shaft and for limiting installation loads associated with the installation of said annular wear ring on said stationary spindle shaft, wherein said means includes a plurality of axially spaced apart radially inwardly projecting sealing beads and a plurality of circumferentially spaced apart axially extending bridges connecting adjacent pairs of annular sealing beads for transferring axial installation loads from one annular sealing bead to another annular sealing bead.

8. A sealing device as recited in claim 7, wherein said radially inner surface of said annular wear ring is provided with an elastomeric material which includes said means for providing radial torque resistance between said annular wear ring and said stationary spindle shaft and for limiting installation loads associated with the installation of said annular wear ring on said stationary spindle shaft.

9. A sealing device as recited in claim 8, wherein said plurality of radially inwardly projecting sealing beads and said plurality of circumferentially spaced apart axially extending bridges are of equal radial height.

10. A sealing device as recited in claim 9, wherein said plurality of inwardly projecting sealing beads includes first through fifth inwardly projecting sealing beads, with the first sealing bead disposed adjacent an inboard side of said sealing device and the fifth sealing bead disposed adjacent an outboard side of said sealing device.

11. A sealing device as recited in claim 10, wherein a first set of circumferentially spaced apart axially extending bridges extend between the first and second inwardly projecting sealing beads, and a second set of circumferentially spaced apart axially extending bridges extend between the second and third inwardly projecting sealing beads.

12. A sealing device as recited in claim 11, wherein said first set of circumferentially spaced apart axially extending bridges are disposed in alternating staggered relationship with respect to said second set of circumferentially spaced apart axially extending bridges.

13. A sealing device for installation on the wheel end of a vehicle comprising:
   a) an annular casing having a radially outer surface configured to sealingly engage an accommodating surface of a wheel hub mounted for rotation about a stationary spindle shaft; and
   b) an annular wear ring mounted coaxial with said annular casing and having a radially inner surface configured to sealingly engage an outer periphery of a stationary spindle shaft, said inner surface of said annular wear ring having a plurality of axially spaced apart radially inwardly projecting annular sealing beads formed thereon, and a plurality of circumferentially spaced apart axially extending bridges extending from at least one of said annular sealing beads for transferring axial installation loads to an adjacent annular sealing bead.

14. A sealing device as recited in claim 13, wherein said plurality of radially inwardly projecting annular sealing beads and said plurality of axially extending bridges are of equal radial height.

15. A sealing device as recited in claim 13, wherein said plurality of radially inwardly projecting sealing beads includes first through fifth radially inwardly projecting sealing beads, with the first sealing bead defining a leading sealing bead disposed adjacent an inboard side of said sealing device and the fifth sealing bead defining a trailing sealing bead disposed adjacent an outboard side of said sealing device.

16. A sealing device as recited in claim 15, wherein a first set of circumferentially spaced apart axially extending bridges extend from an inboard side of the first radially inwardly projecting sealing bead, a second set of circumferentially spaced apart axially extending bridges extend between the first and second radially inwardly projecting sealing beads, and a third set of circumferentially spaced apart axially extending bridges extend between the second and third radially inwardly projecting sealing beads.

17. A sealing device as recited in claim 16, wherein said first set of circumferentially spaced apart axially extending bridges are disposed in alternating relationship with respect to said second set of circumferentially spaced apart axially extending bridges, and said second set of circumferentially spaced apart axially extending bridges are disposed in alternating relationship with respect to said third set of circumferentially spaced apart axially extending bridges.

18. A sealing device for installation on the wheel end of a vehicle comprising:
a) an annular casing having a radially outer surface configured to sealingly engage an accommodating surface of a wheel hub mounted for rotation about a stationary spindle shaft, said outer surface of said annular casing formed of a compliant material having a plurality of axially spaced apart radially outwardly projecting annular sealing ribs formed thereon, and a plurality of circumferentially spaced apart axially extending bridges extending between adjacent pairs of said sealing ribs for transferring axial installation loads from one annular sealing rib to another annular sealing rib; and
b) an annular wear ring mounted coaxial with said annular casing and having a radially inner surface configured to sealingly engage an outer periphery of a stationary spindle shaft.

19. A sealing device as recited in claim 18, wherein said plurality of radially outwardly projecting sealing ribs and said plurality of axially extending bridges associated therewith are of equal radial height.

20. A sealing device as recited in claim 18, wherein said radially inner surface of said annular wear ring is defined by an elastomeric material having a plurality of axially spaced apart radially inwardly projecting annular sealing beads formed thereon and a plurality of circumferentially spaced apart axially extending bridges extending between adjacent pairs of said sealing beads.

21. A sealing device as recited in claim 20, wherein said plurality of radially inwardly projecting sealing beads and said plurality of axially extending bridges associated therewith are of equal radial height.

22. A sealing device as recited in claim 20, wherein said plurality of radially inwardly projecting sealing beads of said wear ring includes first through fifth radially inwardly projecting sealing beads, with the first sealing bead defining a leading sealing bead disposed adjacent an inboard side of said sealing device and the fifth sealing bead defining a trailing sealing bead disposed adjacent an outboard side of said sealing device.

23. A sealing device as recited in claim 22, wherein a first set of circumferentially spaced apart axially extending bridges extend between the first and second radially inwardly projecting sealing beads, and a second set circumferentially spaced apart axially extending bridges extend between the second and third radially inwardly projecting sealing beads.

24. A sealing device as recited in claim 23, wherein said first set of circumferentially spaced apart axially extending bridges on said wear ring are disposed in alternating relationship with respect to said second set of circumferentially spaced apart axially extending bridges on said wear ring.

25. A sealing device as recited in claim 18, wherein said plurality of radially outwardly projecting sealing ribs on said outer casing includes first through fifth radially outwardly projecting sealing ribs, with the first sealing rib defining a leading sealing rib disposed adjacent an outboard side of said sealing device and the fifth sealing rib defining a trailing sealing rib disposed adjacent an inboard side of said sealing device.

26. A sealing device as recited in claim 25, wherein a first set of circumferentially spaced apart axially extending bridges extend between the first and second radially outwardly projecting sealing ribs, and a second set circumferentially spaced apart axially extending bridges extend between the second and third radially outwardly projecting sealing ribs.

27. A sealing device as recited in claim 26, wherein said first set of circumferentially spaced apart axially extending bridges are disposed in alternating relationship with respect to said second set of circumferentially spaced apart axially extending bridges.

28. A sealing device for installation on the wheel end of a vehicle comprising:
a) an annular casing having a radially outer surface configured to sealingly engage an accomodating surface of a wheel hub mounted for rotation about a stationary spindle shaft, said outer surface of said annular casing having means for providing radial torque resistance between said annular casing and said wheel hub and for limiting installation loads associated with the installation of said annular casing in said wheel hub, wherein said means includes a plurality of axially spaced apart radially inwardly projecting sealing beads and a plurality of circumferentially spaced apart axially extending bridges extending between adjacent pairs of annular sealing beads for transferring axial installation loads from one annular sealing bead to another annular sealing bead; and
b) an annular wear ring mounted coaxial with said annular casing and having a radially inner surface configured to sealingly engage an outer periphery of a stationary spindle shaft, said inner surface of said annular wear ring having means for providing radial torque resistance between said annular wear ring and said stationary spindle shaft and for limiting installation loads associated with the installation of said annular wear ring on said stationary spindle shaft, wherein said means includes a plurality of axially spaced apart outwardly projecting sealing ribs and a plurality of circumferentially spaced apart axially extending bridges extending between adjacent pairs of annular sealing ribs for transferring axial installation loads from one annular sealing rib to another annular sealing rib.

29. A sealing device as recited in claim 28, wherein said radially outer surface of said annular casing is provided with an elastomeric material which includes said means for providing radial torque resistance between said annular casing and said wheel hub and for limiting installation loads associated with the installation of said annular casing in said wheel hub.

30. A sealing device as recited in claim 28, wherein said radially inner surface of said annular wear ring is provided with an elastomeric material which includes said means for providing radial torque resistance between said annular wear ring and said stationary spindle shaft and for limiting installation loads associated with the installation of said annular wear ring on said stationary spindle shaft.

* * * * *